(12) United States Patent
Belew (10) Patent No.: US 6,378,212 B1
(45) Date of Patent: Apr. 30, 2002

(54) PIPE ENTRY DEVICE

(75) Inventor: Michael Shane Belew, Columbus, OH (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/476,310

(22) Filed: Dec. 30, 1999

(51) Int. Cl.⁷ .............................................. B23D 21/08
(52) U.S. Cl. ............................ 30/101; 30/92.5; 30/102
(58) Field of Search ........................... 30/92, 92.5, 93, 30/94, 95, 101, 102; 83/13

(56) References Cited

U.S. PATENT DOCUMENTS

| | | | |
|---|---|---|---|
| 463,102 A | | 11/1891 | Courtemanche |
| 554,028 A | * | 2/1896 | Marso |
| 691,649 A | | 1/1902 | Mitchell |
| 2,288,670 A | * | 7/1942 | Babiary |
| 2,622,323 A | | 12/1952 | Grimaldi |
| 3,639,980 A | * | 2/1972 | Muse et al. |
| 3,885,261 A | * | 5/1975 | Skvarenina |
| 4,063,355 A | | 12/1977 | Netzel ............................ 30/96 |
| 4,078,304 A | | 3/1978 | Netzel ......................... 30/101 |
| 4,103,419 A | | 8/1978 | Matthews et al. ............. 30/95 |

FOREIGN PATENT DOCUMENTS

| | | |
|---|---|---|
| CA | 987485 | 4/1976 |
| FR | 492691 | 7/1919 |
| GB | 24695 | of 1902 |
| GB | 1464606 | 2/1977 |
| JP | 61-203213 | 9/1986 |

* cited by examiner

*Primary Examiner*—Hwei-Siu Payer (57) ABSTRACT

The present invention relates to a pipe cutting device for cutting a pipe or conduit. The device includes a first supporting portion and a second supporting portion associated with the first supporting portion. The first and second supporting portions are configured and dimensioned to at least partially encircle an opening to encompass a pipe to be cut. The device also includes at least two cutters positioned in one of the first and second supporting portions for engaging a pipe to be cut, the cutters being interchangeably rotatable between a circumferential cutting direction and a longitudinal cutting direction. The device is movable relative to a pipe to be cut and cuts the pipe interchangeably in either the longitudinal cutting direction or the circumferential cutting direction. Cutting in the longitudinal cutting direction creates at least two substantially longitudinal cuts in the pipe and cutting in the circumferential direction creates a circumferential cut in the pipe.

8 Claims, 5 Drawing Sheets

PIPE ENTRY DEVICE

FIELD OF THE INVENTION

The present invention relates to a pipe entry tool for cutting and entering a pipe or conduit.

BACKGROUND OF THE INVENTION

Fiber optic cables are housed in a variety of ways in order to protect them from the harsh environments in which they are installed. For instance, fiber optic cables have been housed in PVC or metal pipes to protect them from unstable soil, from heavy traffic right of way, and in areas where the cable engineer feels that the cable may be in jeopardy. Once a cable is installed in its environment, it is often difficult to gain access to the fibers inside the cable for repair or maintenance.

It is often necessary to gain access to pipes, such as 2 or 4 inch diameter pipes, for example, for repair or maintenance purposes. These pipes are often located in tight quarters, but may also be located in open space environments. Presently, the tools available for cutting pipes are side grinders, power saws, or an assortment of nibblers. Each of these tools requires AC power in order to operate. Manholes and low-lying areas are not conducive to the use of power tools due to the possibility that explosive gases may be present, which may be ignited by a spark generated by the power tools. Thus, a manually operated tool is desirable in gaining access to pipes.

In addition, side grinders and power saws are undesirable in that they can be hazardous to the material inside the pipe due to spark discharge, blade fragmentation, and excessive depth of cut. Nibblers are useful on pipes which have sufficient interior space inside the pipe to accept the entrance of the nibbler foot, but many pipes, such as 2 or 4 inch pipes, often do not have ample interior space available to accept the nibbler foot. Current methods of opening pipes have been found to cause more harm than benefit. As a result, the fiber optic cable is often required to be put out of service for fear of damage to the unprotected fibers in the pipe or possible disruption of service. Thus, a tool is needed that allows quick access to fiber optic cables located within PVC or metal pipes and is simple to operate, safe for the operator, and unlikely to damage the fiber optic cables inside the pipe.

A large number of pipe sizes are utilized in housing cables. PVC and metal pipes typically range in diameter from about 2 to 12 inches, with 2 and 4 inch pipes being common, and usually have a wall thickness of about ⅛ to ¼ inch. Thus, it is desirable, to provide a single device which is capable of cutting a number of differently sized pipes.

Also, in gaining access to the interior of PVC or metal pipes, it is often desirable to cut a section out of the pipe, such as in the shape of a window, in order to perform operations on the cables installed inside the pipe. This requires cutting the pipe in both a longitudinal direction and a circumferential direction. A window can be formed by making two cuts in a circumferential manner and two cuts in a longitudinal manner, thereby freeing a substantially rectangular section of the pipe wall from the remainder of the wall. Thus, it is desirable to provide a device which can interchangeably cut a pipe in both the longitudinal and circumferential directions.

There are many types of manually operated pipe cutters known in the art. Typically these pipe cutters include a cutting wheel and rollers mounted on a curved frame which either entirely or partially surround the pipe and include a handle for turning the cutter. Some of the cutters rely on a spring for resiliently forcing the cutter into the conduit or pipe. Others employ an adjustable screw mechanism for forcing the cutting wheel into engagement with the pipe and for regulating the cutting force as the wheel penetrates the wall of the pipe.

A number of patents have issued that are directed toward manual devices for pipe cutting. For instance, U.S. Pat. No. 463,102 to Courtemanche discloses a cutting device with a single cutting blade which is capable of cutting a pipe in the circumferential direction. The device includes two separate pieces for surrounding a pipe to be cut, with a cutter being fixed to one piece and two rollers being fixed to the other piece. The two pieces are connected by a thumb screw and are adjustably movable relative to each other by adjusting the thumb screw. The device rotates about the pipe to be cut and the thumb screw is tightened down to bring the two pieces together to cut through the pipe. The cutter and rollers are fixed in position on the device.

French Pat. No. 492,691 and U.S. Pat. No. 691,649 to Mitchell each disclose a pipe cutting tool which includes two semicircular portions which form a ring for surrounding the pipe to be cut. Three cutting wheels are disposed in a triangular arrangement about the circumference of the ring. Each of the cutting wheels is adjustably positioned to move in and out relative to the pipe in order to move the cutting blades inwardly to cut the pipe. Cutting occurs in a circumferential manner.

U.S. Pat. No. 2,622,323 to Grimaldi discloses a pipe cutter which includes two semicircular portions which form a ring for surrounding the pipe to be cut. The device includes a single cutting wheel and two rollers. The rollers are positioned on a single bracket and are positioned opposite the cutting wheel on the ring. The cutting wheel and rollers are advanced to cut the pipe by turning screws upon which the cutting wheel and roller carriage are carried. Cutting is performed in a circumferential manner.

U.S. Pat. No. 4,078,304 to Netzel discloses a cutter for cutting corrugated pipe which includes two semicircular members hinged together to form a ring. A cutting wheel is fixed to one of the semicircular portions and four rollers are disposed at evenly spaced locations around the periphery of the ring for guiding the movement of the cutter around the pipe. The two semicircular portions are attached at one end by a pin which is biased-closed by a spring. The spring closure provides for adjustment to assist in cutting and the cutting wheel cuts in a circumferential manner.

U.S. Pat. No. 4,103,419 to Matthews et al. discloses a pipe cutter which includes two members pivoted together to form jaws which can be opened and closed. Each jaw is attached to an elongated portion. The elongated portions together form the handle of the device. Each jaw portion carries two rollers and a cutter is positioned on one of the jaws near one of the rollers. The cutter is adjustable to move inwardly to cut the pipe in a circumferential direction.

British Pat. No. 24,695 discloses a tool that is used to make either a single circumferential cut or a single longitudinal cut. In a first embodiment, the device includes a single cutter and two rollers, which are disposed in a triangular arrangement on a C-shaped member to accommodate one size of pipe. The cutter and rollers are disposed on brackets which are rotatable between the longitudinal and circumferential directions. In a second embodiment, the device includes three cutters which are disposed in a triangular arrangement on the C-shaped member and a single roller. The three cutters are utilized for cutting in the circumferential direction, with the roller acting as a stop. When operated in the longitudinal cutting direction, two of the three cutters are moved out of engagement with the pipe and cutting occurs between a single remaining cutting blade and a roller. In the second embodiment, the pipe rests on the roller. In both embodiments, the cutting wheels and rollers are substantially fixed in position to accommodate one size of pipe.

SUMMARY OF THE INVENTION

The present invention is directed to a pipe cutting device which includes a first supporting portion, a second supporting portion associated with the first supporting portion, and at least two cutters. The first and second supporting portions are configured and dimensioned to at least partially encircle an opening to encompass a pipe to be cut. The cutters are positioned on at least one of the first or second supporting portions for engaging a pipe to be cut and are interchangeably rotatable between a circumferential cutting direction to make a single circumferential cut and a longitudinal cutting direction to simultaneously make at least two longitudinal cuts. The device is movable relative to a pipe to be cut to cut the pipe interchangeably in either the longitudinal cutting direction or the circumferential cutting direction.

The device may also include at least one roller positioned on at least one of the first or second supporting portions. The roller is for engaging a pipe to be cut while the cutters concurrently engage the pipe to be cut. The roller may be disposed on a roller assembly, which includes a screw with a knob attached at an external end thereof and a bracket disposed at an interior end thereof. The screw extends through a screw carriage defined in one of the first or second supporting portions and the bracket holds the roller. The bracket and roller are interchangeably rotatable between the longitudinal cutting direction and the circumferential cutting direction.

In one embodiment of the invention, two cutters are positioned on the first supporting portion and a single roller is positioned on the second supporting portion. The two cutters and single roller are positioned in a substantially triangular arrangement relative to each other.

The cutters may be cutting wheels which rotate upon a central axis. When arranged in the longitudinal cutting direction, the cutting wheels are each preferably positioned substantially parallel to a radii of said pipe to create substantially parallel cuts. A cut is created for each cutting wheel.

In another embodiment of the invention, the first and second supporting portions together substantially encircle the opening to encompass a pipe to be cut. The first and second supporting portions are preferably substantially semicircular and a first end of the first supporting portion is preferably attached to a first end of the second supporting portion by a hinge pin. The second end of the first supporting portion may be associated with a second end of the second supporting portion by a locking mechanism for removably locking the first and second supporting portions together. The first and second supporting portions at the second ends thereof may have at least one hole in aligned relation with one another and the locking mechanism may include at least one locking pin for insertion into and removal from the aligned holes in the first and second supporting portions.

The device may include a cutter assembly for supporting each cutter. Each cutter assembly may include a housing with a screw carriage defined therethrough, a screw extending through the screw carriage, a knob disposed at an exterior end of the screw, and a single cutter disposed at an interior end of the screw. The knob of the cutter assembly may serve as a handle for rotating the device around a pipe. In this embodiment, at least one of the first and second supporting members includes a through slot extending radially therethrough. The slot includes an inwardly defined ledge, with the cutter assembly extending through the slot and the cutter housing seating on the inwardly defined ledge of the slot. The slot extends radially through the first supporting member and two cutter assemblies are positioned on the ledge defined in the slot. The cutters of the cutter assemblies extend through the slot and into the opening of the device for cutting engagement with a pipe. Each cutter assembly may be independently positionable within the slot at a plurality of locations.

Each cutter assembly may be secured to one of the first or second supporting portions by a retaining element. The retaining element may be a pin which extends through at least one hole defined axially through the cutter housing and one of the first supporting portion or second supporting portion. The cutter assembly may also include a bracket disposed at the interior end of the screw. The cutter is attached to the bracket by a pin. The bracket is interchangeably rotatable to rotate the cutter between a longitudinal cutting direction and a circumferential cutting direction.

The first and second supporting portions and cutters may be formed of a hardened steel.

The invention also includes a method for cutting a window out of a pipe wall. The method includes providing a pipe cutting device having at least two rotatable cutters which are interchangeably rotatable between a longitudinal cutting direction and a circumferential cutting direction and positioning the pipe cutting device substantially around a pipe to be cut with the cutters positioned for cutting in the longitudinal cutting direction. The pipe cutting device is moved longitudinally along the wall of the pipe to simultaneously make at least two longitudinal cuts through the pipe wall. The longitudinal cuts each have a first end and a second end which are substantially longitudinally aligned with one another. The pipe cutting device is positioned at the first end of the longitudinal cuts with the cutters positioned for cutting in the circumferential cutting direction. The pipe cutting device is moved circumferentially around at least a portion of the wall of the pipe at the first end of the longitudinal cuts to cut the pipe wall circumferentially substantially at least between the longitudinal cuts. Then the device is positioned at the second end of the longitudinal cuts with the cutters positioned for cutting in the circumferential cutting direction. The device is then moved circumferentially around at least a portion of the wall of the pipe at the second end of the longitudinal cuts to cut the pipe wall circumferentially substantially at least between the longitudinal cuts. The longitudinal cuts and two circumferential cuts together create a cut portion of said pipe wall which is removable from the pipe to expose an open window to an interior of the pipe.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE PREFERRED EMBODIMENTS

As used herein, circumferential refers to around the circumference of the pipe. Longitudinal refers to along the length of the pipe, i.e., perpendicular to the circumferential direction.

In accordance with the invention, the pipe entry device of the present invention is a hand-held, manually operated device that requires no power other than that manually provided by the operator. The device allows the user to gain access to the interior of a pipe in a safe and effective manner without the need for electrical power. The pipe cutter has the advantage of being non-invasive because the cutting blades remain on the outside of the pipe during cutting, thereby limiting the likelihood of damage to the cables inside the pipe. The pipe entry device of the invention preferably locks around the pipe and has adjustable cutting wheels which cut into the pipe. The device is preferably manufactured of a heavy-duty hardened steel, altogether other materials may be utilized. The type of material utilized is not critical to the invention. The material should have a strength sufficient to withstand forces associated with cutting the pipe.

Figure 1:
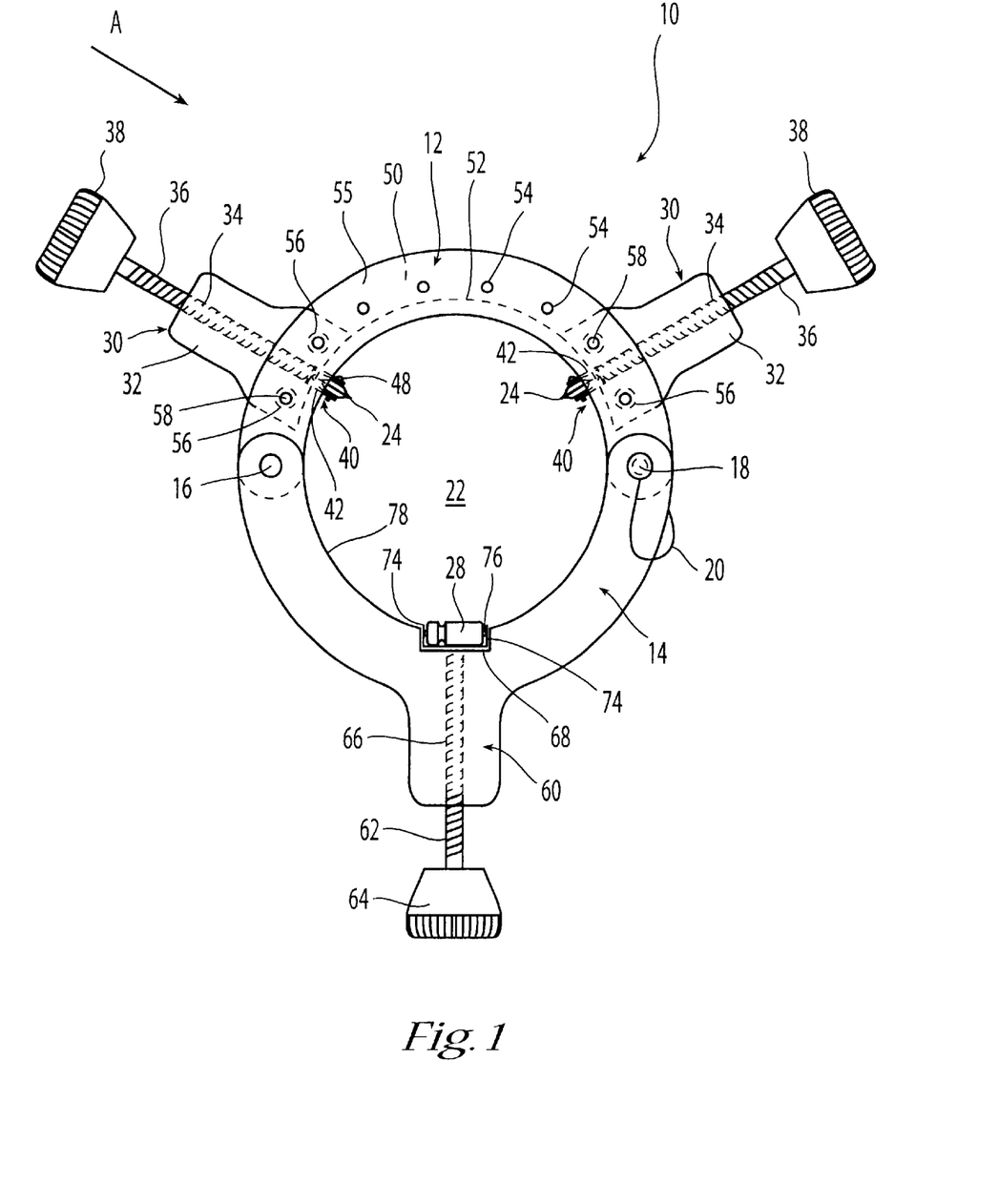
FIG. 1 is a front view of one embodiment of the pipe cutting device of the present invention showing the cutting mechanisms ready for cutting the pipe in a longitudinal direction, with the interior of the device shown in phantom.

Referring to FIG. 1, the pipe entry device of the present invention is indicated generally by the reference character 10 and includes a first semicircular member 12 associated with a second semicircular member 14. The first semicircular member 12 is connected to the second semicircular member 14 by way of hinge pin 16, which extends through openings defined in one end of first and second semicircular members 12, 14. At the other end of the semicircular members 12, 14, a locking pin 18 is disposed in openings defined in the first and second members 12, 14. Locking pin 18 is preferably removable and attached to either the first or the second semicircular members 12, 14 by way of a connecting cord 20. Connecting cord 20, while optional, helps to prevent loss of the locking pin 18. In addition, any other type of locking mechanism may be utilized with the device, as long as it locks the two semicircular members together when so desired.

When locking pin 18 is removed, first and second semicircular members 12, 14 may be opened in a clam shell-like manner, but remain connected to each other at hinge pin 16. When the first and second semicircular members 12, 14 are opened, the device may be placed around a pipe or other conduit to be cut. A pipe or other conduit is positioned in space 22 during operation of the device on the pipe.

Figure 3:
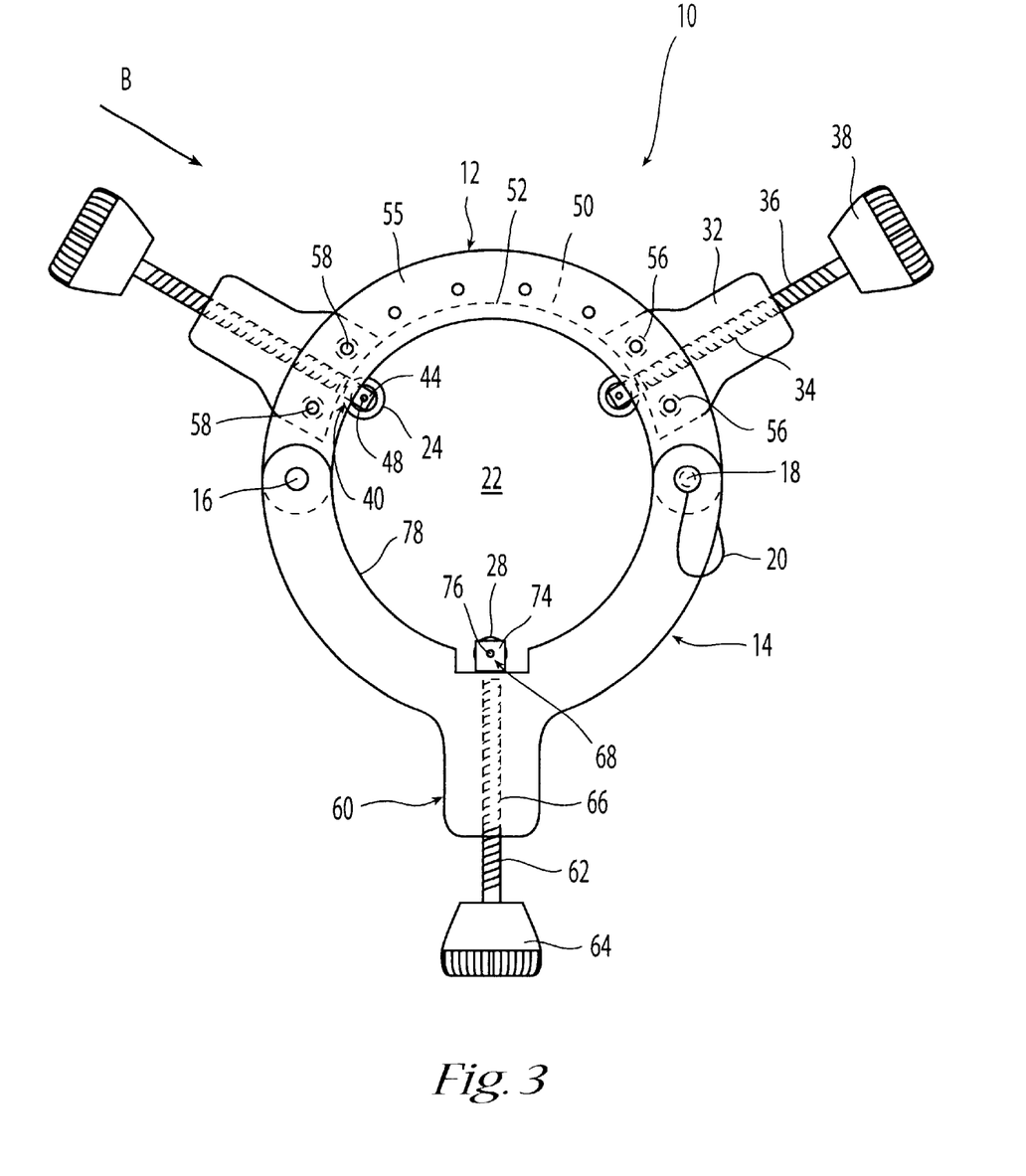
FIG. 3 is a front view of the device of FIG. 1 showing the cutting mechanisms rotated for cutting a pipe in a circumferential direction, with the interior of the device shown in phantom.

The pipe entry device 10 of the present invention preferably includes at least two cutters in the form of cutting wheels 24 and at least one roller 28. In a preferred embodiment, two cutting wheels 24 are disposed on the first semicircular member 12 and a single roller 28 is disposed on the second semicircular member 14. The cutters 24 and roller 28 are preferably disposed in a triangular manner relative to one another, as shown in FIGS. 1 and 3.

Figure 2:
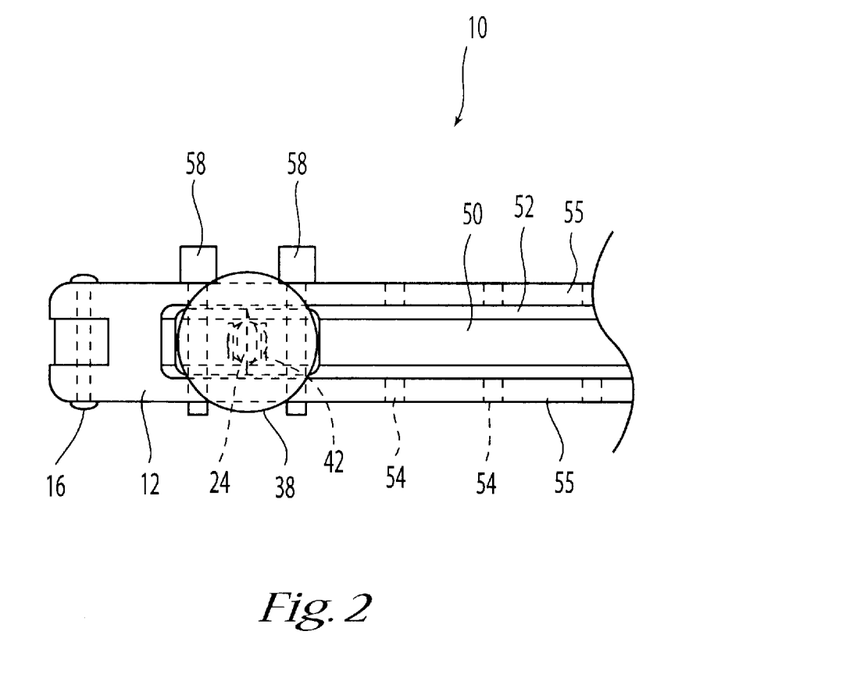
FIG. 2 is a partial top view of the cutter shown in FIG. 1, as viewed in the direction of arrow A.
Figure 4:
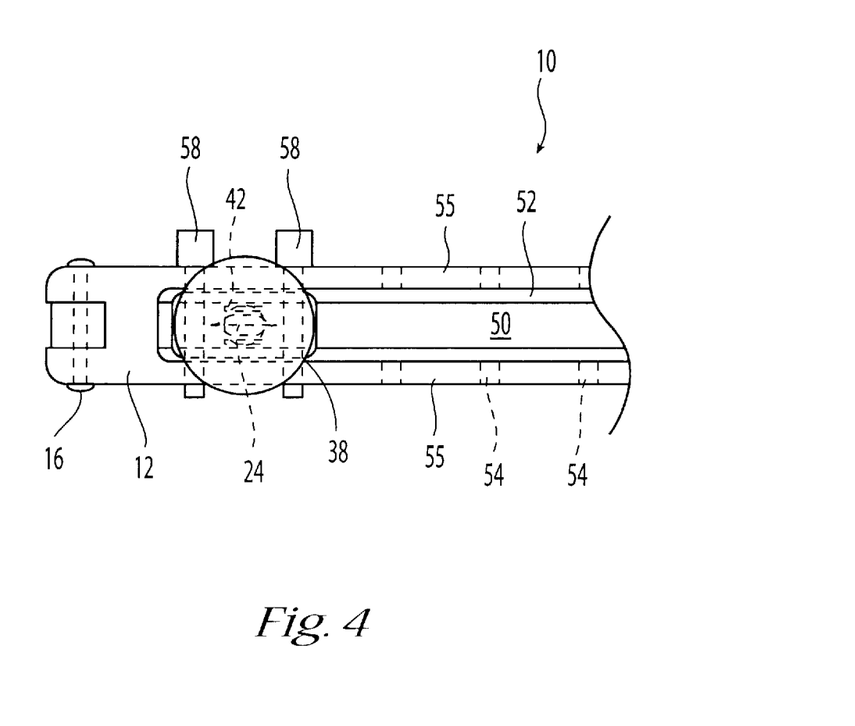
FIG. 4 is a partial top view of the cutter shown in FIG. 3, as viewed in the direction of arrow B.

Cutters 24 are preferably housed in cutter assemblies 30. One cutter assembly 30 is preferably provided for each cutting wheel 24, although it is anticipated that a single cutter assembly could house more than one cutting wheel. Cutter assemblies 30, as shown in FIGS. 1–4, include a housing portion 32 with a screw carriage 34 in the form of a threaded opening defined through housing portion 32. A screw rod 36 is positioned through screw carriage 34. A hand tightening knob 38 is connected to the screw rod 36 at one end thereof and a cutter unit 40 is provided at the other end of screw rod 36. Knob 38 is preferably positioned on an exterior end of the cutter assembly so that it extends outside of the device 10. Cutter unit 40 preferably extends at an inner end of cutter assembly 30 so that it is substantially positioned within an interior space 22 of the pipe entry device 10. Cutter unit 40 includes a bracket 42, which is attached to an interior end of the screw 36. Bracket 42 has two arms 44 (FIG. 3) which extend parallel to one another and away from screw 36. The cutting wheel 24 is positioned between arms 44 and attached thereto by a pin 48. Pin 48 secures cutting wheel 24 to bracket 42. Bracket 42 and cutting wheel 24 are rotatable such that cutting wheel 24 may be positioned, in one instance, for cutting in the longitudinal direction, as shown in FIG. 2. In a second instance, bracket 42 and cutting wheel 24 are rotatable such that cutting wheel 24 may be positioned for cutting in the circumferential direction, as shown in FIG. 4.

In a preferred embodiment, cutter assemblies 30 are positioned in a slot 50. In the embodiments depicted in FIGS. 1–6, the slot 50 is defined within the periphery of first semicircular member 12. As shown in FIGS. 2 and 4, slot 50 extends entirely through first semicircular member 12 and includes ledge portion 52 positioned at the bottom of the slot 50 along the interior edge of the first semicircular member 12. Housing portions 32 of cutter assemblies 30 rest on ledge 52 when positioned in slot 50. Cutter unit 40 is dimensioned and configured so that it extends through slot 50 to allow the cutting wheel 24 to be advanced into the interior 22 of the device 10. The cutter unit 40 can be rotated so that cutting wheels 24 can cut in either a longitudinal direction or a circumferential direction.

A plurality of pairs of holes 54 are disposed in radial and axial alignment in the walls 55 defined on either side of slot 50 in first semicircular member 12. Cutter assemblies 30 preferably also include two holes 56 defined in cutter housing portion 32. Holes 56 extend through each cutter housing 32 from front to back. It should be noted that the number of holes is not critical to the invention. Holes 54 are dimensioned and configured for mating with holes 56 in cutter housing 32. Holes 54 are preferably evenly spaced along the length of slot 50 such that cutter assemblies 30 may be positioned at a number of locations along the length of slot 50. Holes 56 align with holes 54 in the first semicircular member 12 and are for receiving retaining pins 58, which extend through the holes 54 in the first semicircular member 12 and holes 56 in the cutter housing 32 to hold the cutter assemblies 30 in a fixed radial position in slot 50.

Figure 5:
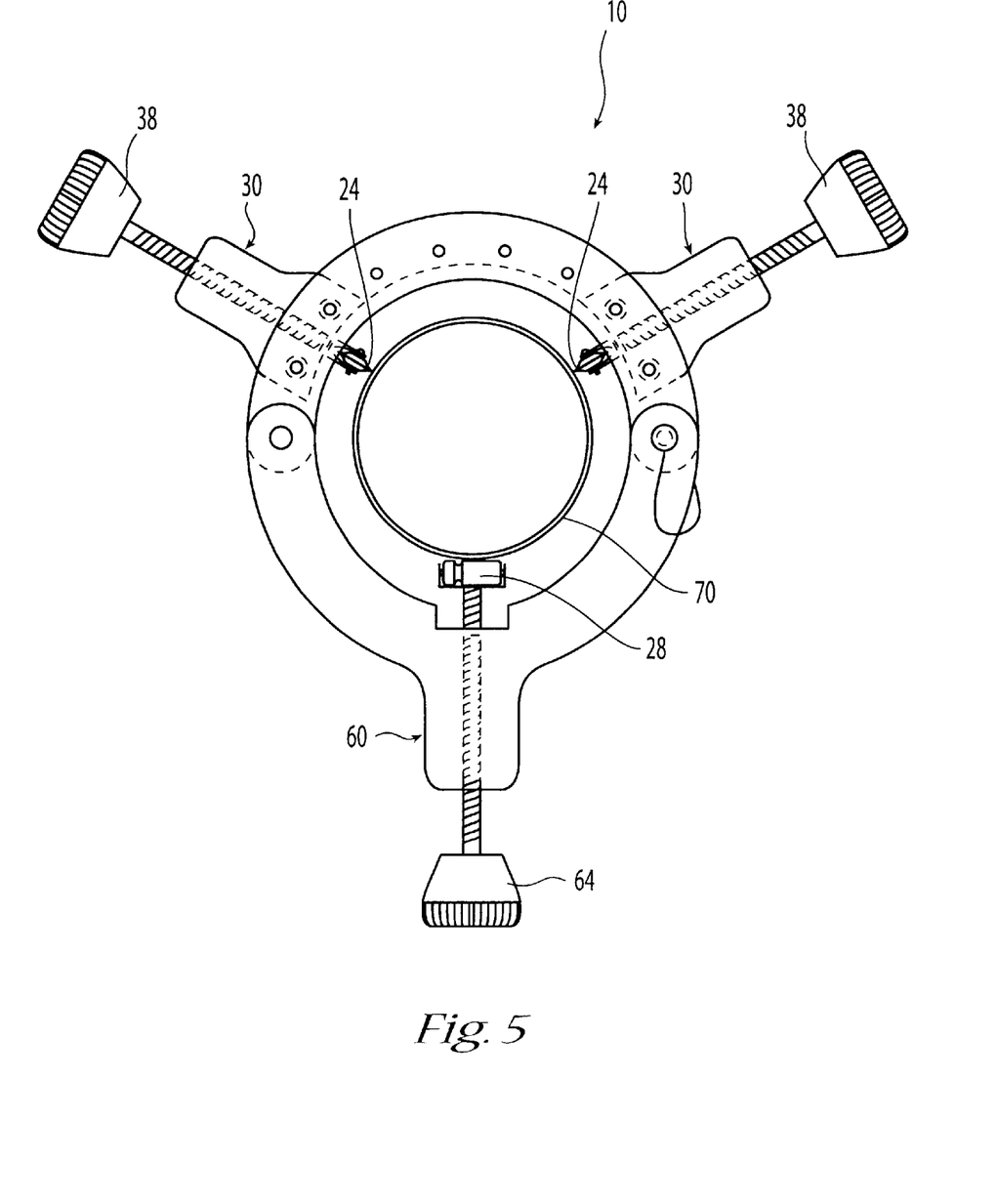
FIG. 5 is a front view of one embodiment of the device of the invention showing the device operating on a four inch pipe in the longitudinal cutting direction.

By providing a number of holes 54 in first semicircular member 14, cutter assemblies 30 may be moved to a variety of positions within slot 50 in order to accommodate differently sized pipes or tubes to be cut and to provide differently sized cut windows in the pipes. For instance, as shown in FIG. 5, in one embodiment of the invention, a pipe 70 is accepted in opening 22 of device 10, which is configured to cut in the longitudinal direction. In this embodiment, the diameter of open space 22 is about 5 inches and the pipe 70 diameter is about 4 inches. As shown, the cutter assemblies 30 are spaced at the outermost radial locations within slot 50 so that a wide window section of pipe 70 is cut when the cutters are positioned to cut longitudinally. Alternatively, if cutter assemblies 30 are spaced more closely together within slot 50, such that they abut one another (not shown), for example, then the cut out window section would be narrower in pipe 70 than that depicted in FIG. 5.

Figure 6:
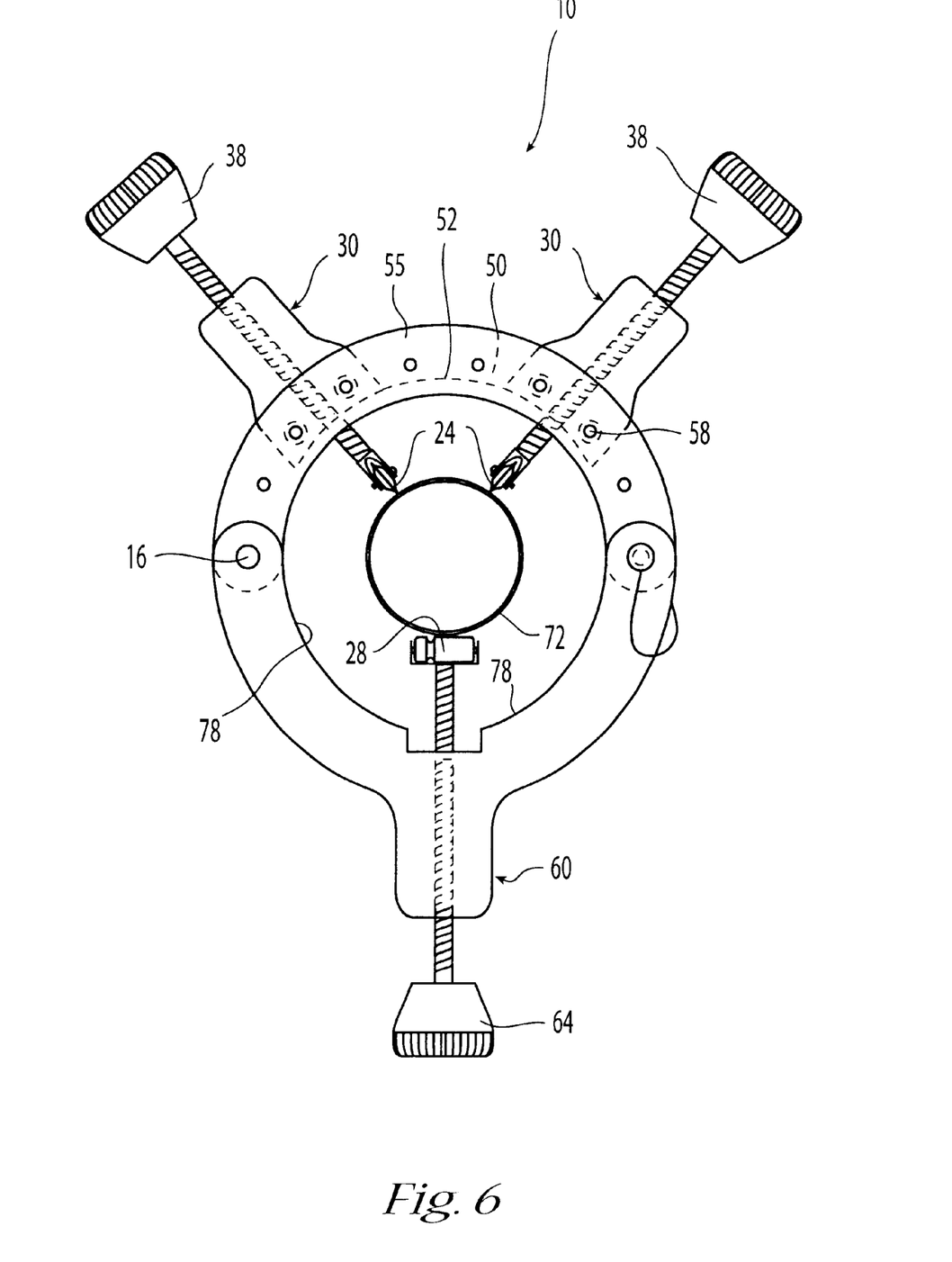
FIG. 6 is a front view of the device shown in FIG. 5 except the device is operating on a two inch pipe in the longitudinal cutting direction.

The device 10 is also adjustable to accept smaller diameter pipes, such as a pipe diameter of two inches, as shown for the same device 10 in FIG. 6. In FIG. 6, the radius of open space 22 is about 5 inches and the pipe 72 diameter is about 2 inches. As shown, the cutters 24 are positioned to cut a relatively narrow section of the pipe 72 in the longitudinal cutting direction. Alternatively, for example, if the cutter assemblies 30 were spaced at the ends of slot 50, the cutters 24 would cut approximately one-half of the pipe away in the form of a window section. Thus, the provision of a plurality of locations for positioning the cutter assemblies 30 within slot 50 allows for a wide variety of possibilities with respect to the size of the cut window and the pipe size. While an example of a device for accommodating 2 and 4 inch pipes is depicted, the device may be made larger to accommodate larger diameter pipes, or smaller to accommodate smaller diameter pipes.

Referring to FIGS. 1 and 3, the pipe entry device 10 also includes roller 28 disposed on roller assembly 60. Roller assembly 60 includes a screw 62, a hand tightening knob 64 positioned at one end of screw 62, and a roller 28 positioned at the other end of screw 62. Screw 62 extends through screw carriage 66, which extends radially through second semicircular member 14. Knob 64 is preferably positioned to extend outwardly from the pipe entry device 10 and roller 28 is preferably positioned to extend into the interior space 22 of the device 10 for contacting a pipe to be cut. Roller 28 is preferably positioned on a bracket 68, which is connected to screw 62 at the interior end thereof. Bracket 68 includes arms 74 which also extend radially inwardly on either end of roller 28. A pin 76 preferably extends through roller 28 and engages arms 74 to hold roller 28 in position on roller assembly 60. Roller assembly 60 can be rotated such that the roller 28 is positioned for engaging a pipe when the device 10 is in either the circumferential cutting position or the longitudinal cutting position. In addition, roller 28 may be advanced into interior space 22 by turning screw 62 within screw carriage 66. Thus, depending on the size of the pipe being cut, roller assembly 60 may be advanced into interior space 22 to meet the pipe to hold it in position during cutting. For example, as shown in FIG. 6, where a smaller diameter pipe is being cut, roller assembly 60 is advanced such that roller 28 is positioned approximately 1½ inches from the inner wall 78 (FIG. 3) of second semicircular member 14 such that roller 28 contacts pipe 72.

Alternatively, as shown in FIG. 5 for a larger diameter 4 inch pipe, roller assembly 60 is advanced a smaller distance into interior space 22 such that roller 28 meets pipe 70.

It should be noted that it is also contemplated that a slot (not shown) can be provided in second semicircular member 14, similar to that already discussed for first semicircular member 12. In this case, the roller assembly 60 can be positioned in the slot, as well as additional cutter assemblies 30 or roller assemblies 60. The roller assemblies 60 would then include a roller housing having the screw carriage defined therethrough. The roller assembly would then be movable, if so desired.

Other configurations for placement of the cutters and roller are also anticipated. For instance, based upon the present disclosure, one of ordinary skill in the art would understand that the device can be configured such that one cutter 24 is positioned on one of the semicircular members and a second cutter 24 and a roller 28 may be positioned on the other semicircular member. In this instance, it would be advantageous to provide a slot 50 in both the first and second semicircular members 12, 14. In addition, more than two cutters may be desirable and are anticipated for use with the present invention. If, for instance, three cutters were utilized, the three cutters would act in concert during cutting in the circumferential direction to create a single cut line and would act independently of one another in the longitudinal cutting direction to create three cut lines. The same would be true for four or more cutters. In addition, if one cutter is provided on each semicircular member, it may be desirable to provide two rollers, one disposed on each semicircular member. Thus, it is clear that a significant number of combinations of rollers and cutters are anticipated for use with the present invention.

Now, considering the operation of device 10, first a user exposes the pipe to be cut and positions the pipe cutter device 10 around the pipe, such as is shown in FIGS. 5 and 6. The device 10 is then locked in place around the pipe by, for example, inserting locking pin 18 into openings defined at the second ends of first and second semicircular members 12, 14. In one mode, shown in FIGS. 1, 2, 5 and 6, the device is capable of making at least two longitudinal cuts by either pushing or pulling the device down the pipe path. Several passes back and forth along the face of the pipe may be necessary in order to cut through the pipe. Alternatively, one pass may be all that is required to cut through the pipe. Cutting time will vary and is dependent upon such factors as pipe thickness and amount of cutting forces applied by the cutters 24 to the pipe during cutting. During each pass, the cutting wheels 24 may be advanced by turning screw 36 in cutter assembly 30. The cutting wheels 24 are positioned at different positions around the circumference of the semicircular members 12, 14 in order to allow for the at least two cuts to be made in the pipe. If two cutting wheels 24 are used, for example, as shown in the figures, two cuts will be made along the length of the pipe. The cutting wheels 24 are each preferably maintained parallel to a radii of the pipe during longitudinal cutting. The cutting wheels 24 are adjusted as the device 10 is pushed or pulled along the length of the pipe by turning the hand tightening knob 38 to advance the screw 36 and cutter 24 in order to increase the depth of cut until the pipe material is severed along the longitudinal path. In this mode, roller 28 is positioned so that the pipe rests on the roller 28 in rolling engagement therewith.

Then, in the second mode, the device 10 is first positioned at one end of the window to be cut from the pipe. The cutting wheels 24 and roller 28 are rotated within cutter assemblies 30 and roller assembly 60, respectively, to cut and support the pipe in a circumferential manner to sever the piece of pipe in the circumferential direction at one end of the longitudinal cuts. Then, the device is moved into position at the other end of the longitudinal cuts and rotated so that cutting wheels 24 make a second circumferential cut in the wall of the pipe. This creates a window in the pipe once the cut out portion of pipe is removed. Severing a window allows the user to gain access to the interior of the pipe. In the second circumferential cutting mode, the pipe entry device 10 is twisted or rotated around the pipe first at the first end of the window to be cut and then at the second end of the window to be cut. The device may be twisted around the circumference to create a cut all the way around the pipe or may be rotated only in the portion of the pipe adjacent the longitudinal cuts to create a cut on only a portion of the circumference of the pipe. During rotation, the depth of the cutting wheels is adjusted until the pipe is severed. After cutting is completed in both the longitudinal and circumferential directions, the piece of pipe which has been severed can be removed, allowing the user access to the interior of the pipe.

While the description thus far has assumed that the pipe being cut is stationary, there may be instances where the pipe entry device 10 is utilized with a pipe which is not stationary. In this latter instance, the pipe may be cut by either rotating or twisting the pipe within the pipe entry device 10 or by rotating or twisting the pipe entry device around the pipe.

As discussed above, the pipe entry device is preferably adjustable so that it can accommodate more than one diameter pipe size, such as both a 2 inch pipe and a 4 inch pipe. The device is also operative on a plurality of pipe thicknesses, such as, for example, schedule 20 and schedule 40 pipe thicknesses, among others.

It should be noted that while first and second semicircular members 12, 14 are described as being semicircular to form a ring, other shapes for the members 12, 14 are also contemplated. For instance, it may be desirable and beneficial to configure first and second semicircular members in other shapes, such as a U-shape, so that when the members are joined together, they form a square or rectangle. Alternatively, there may be instances where a diamond shape is preferred, so that first and second members are substantially V-shaped before being joined together. Lastly, it is contemplated that a non-surrounding combination of shaped members may be used. Any such variations are contemplated for use with the present invention and the present invention should not be limited to only semicircular members.

In addition, while the preferred embodiment is described as including a roller with two cutters, it is anticipated that the device can be properly operated without a roller of any sort. An abutment may be utilized instead of a roller, such as a foot. Alternatively, a pipe can rest along the inner wall of the first and/or second semicircular members during cutting.

While various descriptions of the present invention are described above, it should be understood that the various features can be used singly or in any combination thereof. Therefore, this invention is not to be limited to only the specifically preferred embodiments depicted herein. Variations and modifications within the spirit and scope of the invention, beyond those discussed herein, may occur to those skilled in the art to which the invention pertains. Accordingly, all expedient modifications readily attainable by one versed in the art from the disclosure set forth herein are to be included as further embodiments of the present invention. The scope of the present invention accordingly is to be defined as set forth in the appended claims.

What is claimed is:

1. A pipe cutting device comprising:

a first supporting portion;

a second supporting portion associated with the first supporting portion, said first and second supporting portions together substantially encircling a pipe to be cut, wherein said first supporting portion is substantially semicircular, said second supporting portion is substantially semicircular, and a first end of said first supporting portion is attached to a first end of said second supporting portion by a hinge pin, and wherein a second end of said first supporting portion is associated with a second end of said second supporting portion by a locking mechanism for removably locking the first and second supporting portions together;

at least two cutters positioned on at least one of said first and second supporting portions for engaging a pipe to be cut, each of said cutters being interchangeably rotatable between a circumferential cutting direction to make a circumferential cut and a longitudinal cutting direction to make a longitudinal cut, wherein said pipe cutting device is movable relative to a pipe to be cut to cut a pipe interchangeably in either the longitudinal cutting direction or the circumferential cutting direction and the first and second supporting portions at the second ends thereof have at least one hole in aligned relation with one another and the locking mechanism comprises at least one locking pin for insertion into and removal from the aligned holes in the first and second supporting portions.

2. A pipe cutting device comprising:

a first supporting portion;

a second supporting portion associated with the first supporting portion, said first and second supporting portions being configured and dimensioned to at least partially encircle a pipe to be cut;

at least two cutters positioned on at least one of said first and second supporting portions for engaging a pipe to be cut, each of said cutters being interchangeably rotatable between a circumferential cutting direction to make a circumferential cut and a longitudinal cutting direction to make a longitudinal cut, and a cutter assembly for supporting each cutter, with each cutter assembly including a housing with a screw carriage defined therethrough, a screw extending through said screw carriage, a knob disposed at an exterior end of the screw, and a single cutter disposed at an interior end of the screw, wherein said pipe cutting device is movable relative to a pipe to be cut to cut a pipe interchangeably in either the longitudinal cutting direction or the circumferential cutting direction and at least one of the first and second supporting portions includes a slot extending radially therethrough, said slot including an inwardly defined ledge, with said cutter assembly extending through the slot and said cutter housing seating on the inwardly defined ledge of said slot.

3. The pipe cutting device of claim 2, wherein the slot extends radially through the first supporting portion and two cutter assemblies are positioned on the ledge defined in the slot, with the cutters of the cutter assemblies extending through the slot for cutting engagement with a pipe.

4. The pipe cutting device of claim 2, wherein each cutter assembly is independently positionable within the slot at a plurality of locations therein.

5. The pipe cutting device of claim 2, wherein each cutter assembly is secured to one of the first and second supporting portions by a retaining element.

6. The pipe cutting device of claim 2, wherein the retaining element is a pin which extends through at least one hole defined axially through the cutter housing and one of the first supporting portion and second supporting portion.

7. A method for cutting a window out of a pipe wall comprising:

providing a pipe cutting device having at least two cutters which are interchangeably rotatable between a longitudinal cutting direction and a circumferential cutting direction, wherein in the longitudinal cutting direction, the cutters are capable of making longitudinal cuts and in the circumferential cutting direction, the cutters are capable of making a circumferential cut on the pipe;

positioning the pipe cutting device substantially around a pipe to be cut with the cutters positioned for cutting in the longitudinal cutting direction;

moving the pipe cutting device longitudinally along the wall of the pipe to simultaneously make at least two longitudinal cuts through the pipe wall, said longitudinal cuts each having a first end and a second end which are substantially radially aligned with one another;

positioning the pipe cutting device at the first end of said longitudinal cuts with the cutters positioned for cutting in the circumferential cutting direction;

moving the pipe cutting device circumferentially around at least a portion of the wall of the pipe at the first end of the longitudinal cuts to cut the pipe wall circumferentially substantially at least between the two longitudinal cuts;

positioning the pipe cutting device at the second end of said longitudinal cuts with the cutters positioned for cutting in the circumferential cutting direction; and moving the pipe cutting device circumferentially around at least a portion of the wall of the pipe at the second end of the longitudinal cuts to cut the pipe wall circumferentially substantially at least between the longitudinal cuts, wherein the longitudinal cuts and circumferential cuts together create a cut portion of said pipe wall which is removable from the pipe to expose an open window to an interior of the pipe.

8. A method for cutting a window out of a pipe wall comprising:

providing a pipe cutting device comprising;
a first supporting portion;
a second supporting portion associated with the first supporting portion, first and second supporting portions being configured and dimensioned to at least partially encircle a pipe to be cut; and
at least two cutters positioned on at least one of said first and second supporting portions for engaging a pipe to be cut, each of said cutters being interchangeably rotatable between a circumferential cutting direction to make a circumferential cut and a longitudinal cutting direction to make a longitudinal cut, wherein said pipe cutting device is movable relative to a pipe to be cut to cut a pipe interchangeably in either the longitudinal cutting direction or the circumferential cutting direction, positioning the pipe cutting device substantially around a pipe to be cut with the cutters positioned for cutting in a longitudinal cutting direction;

moving the pipe cutting device longitudinally along the wall of the pipe to simultaneously make at least two longitudinal cuts through the pipe wall, said longitudinal cuts each having a first end and a second end which are substantially radially aligned with one another;

positioning the pipe cutting device at the first end of said longitudinal cuts with the cutters positioned for cutting in a circumferential cutting direction;

moving the pipe cutting device circumferentially around at least a portion of the wall of the pipe at the first end of the longitudinal cuts to cut the pipe wall circumferentially substantially at least between the two longitudinal cuts;

positioning the pipe cutting device at the second end of said longitudinal cuts with the cutters positioned for cutting in the circumferential cutting direction; and moving the pipe cutting device circumferentially around at least a portion of the wall of the pipe at the second end of the longitudinal cuts to cut the pipe wall circumferentially substantially at least between the longitudinal cuts, wherein the longitudinal cuts and circumferential cuts together create a cut portion of said pipe wall which is removable from the pipe to expose an open window to an interior of the pipe.

* * * * *